US012117766B2

(12) United States Patent
Shiraki et al.

(10) Patent No.: US 12,117,766 B2
(45) Date of Patent: *Oct. 15, 2024

(54) PROCESS UNIT

(71) Applicant: Brother Kogyo Kabushiki Kaisha, Nagoya (JP)

(72) Inventors: Masatoshi Shiraki, Nagoya (JP); Hiroki Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,967

(22) Filed: Mar. 3, 2022

(65) Prior Publication Data

US 2022/0187759 A1 Jun. 16, 2022

Related U.S. Application Data

(63) Continuation of application No. 16/703,535, filed on Dec. 4, 2019, now Pat. No. 11,269,289, which is a (Continued)

(30) Foreign Application Priority Data

Mar. 7, 2008 (JP) ................................ 2008-058093

(51) Int. Cl.
*G03G 21/18* (2006.01)

(52) U.S. Cl.
CPC ..... *G03G 21/1817* (2013.01); *G03G 21/1821* (2013.01); *G03G 21/1825* (2013.01); (Continued)

(58) Field of Classification Search
CPC ........... G03G 21/1817; G03G 21/1821; G03G 21/1825; G03G 21/1857; G03G 21/1864; G03G 2221/1687
See application file for complete search history.

(56) References Cited

U.S. PATENT DOCUMENTS 5,258,811 A 11/1993 Miyake et al.
5,758,230 A 5/1998 Nakaue et al.
(Continued)

FOREIGN PATENT DOCUMENTS

EP 0 795 797 A1 9/1997
JP H04-356062 A 12/1992
(Continued)

OTHER PUBLICATIONS

Notification of Reasons for Refusal for Japanese patent application No. 2010-262094 mailed Feb. 8, 2011.
(Continued)

*Primary Examiner* — Walter L Lindsay, Jr.
*Assistant Examiner* — Milton Gonzalez
(74) *Attorney, Agent, or Firm* — Banner & Witcoff, Ltd.

(57) ABSTRACT

A process unit includes a drum frame supporting a photoconductor drum and a development frame supporting a development roller. The development cartridge is swingably supported by the drum frame at a coupling joint provided at a first side of the development frame and a support portion provided at a second side of the development frame. A center of rotation of the development roller is located in a position shifted from a line segment connecting a center of rotation of the coupling joint and a center of rotation of the photoconductor drum to an upstream side with respect to a direction of rotation of the coupling joint as viewed in an axial direction of the development roller, such that the development roller is pressed against the photoconductor drum by the action of the rotatory force received by the coupling joint.

9 Claims, 8 Drawing Sheets

Related U.S. Application Data continuation of application No. 16/528,160, filed on Jul. 31, 2019, now Pat. No. 10,520,885, which is a continuation of application No. 16/035,890, filed on Jul. 16, 2018, now Pat. No. 10,379,489, which is a continuation of application No. 15/453,685, filed on Mar. 8, 2017, now Pat. No. 10,036,998, which is a continuation of application No. 15/144,894, filed on May 3, 2016, now Pat. No. 9,612,572, which is a continuation of application No. 14/719,557, filed on May 22, 2015, now Pat. No. 9,335,731, which is a continuation of application No. 14/094,216, filed on Dec. 2, 2013, now Pat. No. 9,042,776, which is a continuation of application No. 13/539,054, filed on Jun. 29, 2012, now Pat. No. 8,611,787, which is a continuation of application No. 12/371,645, filed on Feb. 16, 2009, now Pat. No. 8,233,820.

(52) U.S. Cl.
CPC ..... *G03G 21/1857* (2013.01); *G03G 21/1864* (2013.01); *G03G 2221/1687* (2013.01)

(56) References Cited

U.S. PATENT DOCUMENTS

| | | | | |
|---|---|---|---|---|
| 5,842,091 | A | 11/1998 | Nakano | |
| 6,636,712 | B2 | 10/2003 | Shimaoka | |
| 7,321,740 | B2 * | 1/2008 | Choi | G03G 21/1825 399/113 |
| 7,369,792 | B2 | 5/2008 | Shiraki | |
| 7,386,253 | B2 | 6/2008 | Ishii et al. | |
| 7,412,188 | B2 | 8/2008 | Ishii et al. | |
| 7,450,882 | B2 | 11/2008 | Shiraki | |
| 7,522,859 | B2 | 4/2009 | Shii et al. | |
| 7,565,092 | B2 | 7/2009 | Shiraki | |
| 7,647,004 | B2 | 1/2010 | Mori | |
| 7,693,442 | B2 | 4/2010 | Sato et al. | |
| 7,693,443 | B2 | 4/2010 | Sato et al. | |
| 7,860,433 | B2 | 12/2010 | Toba et al. | |
| 2003/0185587 | A1 | 10/2003 | Kawai et al. | |
| 2006/0029418 | A1 | 2/2006 | Ishii et al. | |
| 2006/0029419 | A1 | 2/2006 | Shiraki | |
| 2006/0029420 | A1 | 2/2006 | Ishii et al. | |
| 2006/0029421 | A1 | 2/2006 | Ishii et al. | |
| 2006/0029422 | A1 | 2/2006 | Shiraki | |
| 2006/0029423 | A1 | 2/2006 | Shiraki | |
| 2006/0171738 | A1 | 8/2006 | Mori | |
| 2006/0216061 | A1 | 9/2006 | Yamaguchi | |
| 2007/0009281 | A1 | 1/2007 | Sato et al. | |
| 2007/0009282 | A1 | 1/2007 | Sato et al. | |
| 2007/0140725 | A1 | 6/2007 | Kamimura | |
| 2007/0160388 | A1 | 7/2007 | Yoshimura et al. | |
| 2007/0264048 | A1 | 11/2007 | Kuroda | |
| 2008/0159781 | A1 | 7/2008 | Noguchi et al. | |
| 2008/0170880 | A1 | 7/2008 | Hashimoto | |
| 2008/0253803 | A1 | 10/2008 | Nittani et al. | |
| 2009/0110434 | A1 * | 4/2009 | Kusudo | G03G 21/1821 399/109 |
| 2010/0296833 | A1 | 11/2010 | Sato et al. | |
| 2012/0230737 | A1 | 9/2012 | Nakajima et al. | |

FOREIGN PATENT DOCUMENTS

| | | | |
|---|---|---|---|
| JP | H05-66662 | A | 3/1993 |
| JP | H06-110323 | A | 4/1994 |
| JP | H09-244367 | A | 9/1997 |
| JP | H09-319207 | A | 12/1997 |
| JP | 2001066970 | A | 3/2001 |
| JP | 2002040875 | A | 2/2002 |
| JP | 2002189401 | A | 7/2002 |
| JP | 2003114601 | A | 4/2003 |
| JP | 2006184501 | A | 7/2006 |
| JP | 2006208838 | A | 8/2006 |
| JP | 2007024973 | A | 2/2007 |
| JP | 2007-058068 | A | 3/2007 |
| JP | 2007-102152 | A | 4/2007 |
| JP | 2007-127995 | A | 5/2007 |

OTHER PUBLICATIONS

Notification of Reasons for Refusal for Japanese patent application No. 2010-262092 mailed Mar. 15, 2011.

* cited by examiner

PROCESS UNIT

CROSS-REFERENCE TO RELATED APPLICATION(S)

This application is a continuation application of prior U.S. patent application Ser. No. 16/703,535, filed on Dec. 4, 2019, which is a continuation application of prior U.S. patent application Ser. No. 16/528,160, filed on Jul. 31, 2019, which issued Dec. 31, 2019 as U.S. Pat. No. 10,520,885 B2, which is a continuation application of prior U.S. patent application Ser. No. 16/035,890, filed on Jul. 16, 2018, which issued Aug. 13, 2019 as U.S. Pat. No. 10,379,489 B2, which is a continuation application of prior U.S. patent application Ser. No. 15/453,685, filed on Mar. 8, 2017, which issued Jul. 31, 2018 as U.S. Pat. No. 10,036,998, which is a continuation application of prior U.S. patent application Ser. No. 15/144,894, filed May 3, 2016, which issued on Apr. 4, 2017 as U.S. Pat. No. 9,612,572 B2, which is a continuation application of prior U.S. patent application Ser. No. 14/719,557, filed May 22, 2015, which issued on May 10, 2016 as U.S. Pat. No. 9,335,731 B2, which is a continuation application of prior U.S. patent application Ser. No. 14/094,216, filed Dec. 2, 2013, which issued on May 26, 2015 as U.S. Pat. No. 9,042,776 B2, which is a continuation application of U.S. patent application Ser. No. 13/539,054, filed Jun. 29, 2012, which issued on Dec. 17, 2013 as U.S. Pat. No. 8,611,787 B2, which is a continuation application of prior U.S. patent application Ser. No. 12/371,645, filed on Feb. 16, 2009, which issued on Jul. 31, 2012 as U.S. Pat. No. 8,233,820 B2, which claims the foreign priority benefit under Title 35, United States Code, § 119 (a)-(d), of Japanese Patent Application No. 2008-058093 filed on Mar. 7, 2008 in the Japan Patent Office, the disclosure of which is herein incorporated by reference in its entirety.

BACKGROUND OF THE INVENTION

1. Field of the Invention

The present invention relates to a process unit which includes a drum frame by which a photoconductor drum is supported and a development frame by which a development roller is supported.

2. Description of Related Art

A process unit which is removably installed in an image forming apparatus such as a printer is known in the art, for example, as disclosed in Japanese Laid-Open Patent Application, Publication No. JP 2007-127995 A.

The process unit disclosed in JP 2007-127995 A includes a photoconductor cartridge by which a photoconductor drum is rotatably supported and a development cartridge by which a development roller is rotatably supported, the development cartridge being attached to the photoconductor cartridge. A rotatory force produced in the image forming apparatus is transmitted to the development roller by a coupling joint (development coupling) provided at one end in a longitudinal direction of the development cartridge, thereby causing the development roller to rotate. In order that an outer peripheral surface of the development roller should have uniform surface contact with an outer peripheral surface of the photoconductor drum, the development cartridge is pressed against the photoconductor drum by a pressing mechanism.

In the meantime, when the development roller is caused to rotate by the rotatory force transmitted through the coupling joint, a torque about the axis of rotation of the coupling joint acts on the development cartridge. When the torque is small, it would not affect an image to be formed. However, as the torque of the development roller becomes larger due to increase in the image-forming (printing) speed, the torque acting on the development cartridge will become larger accordingly. Since the development cartridge is not fixed relative to the photoconductor drum, the rotatory driving force transmitted through the coupling joint causes the development cartridge to oscillate. As a result, the pressing force acting on the interface between the development roller and the photoconductor drum would become unstable at around the end of the development roller to which the rotatory force is transmitted from the coupling joint; therefore, the pressing force would disadvantageously become excessive, resulting in fogging (a blur or smudge in areas where no toner should have been applied), unevenness of density in proximity to a side edge of a sheet on which an image is formed, or other adverse effects on the quality of the image to be formed.

It would be desirable to form an image of good quality with a stable pressing force provided between the photoconductor drum and the development roller even if the torque acting on the development cartridge becomes larger. The present invention has been made in an attempt to address the above disadvantage. Illustrative, non-limiting embodiments of the present invention overcome the above disadvantage and other disadvantages not described above. Also, the present invention is not required to overcome the disadvantage described above, and an illustrative, non-limiting embodiment of the present invention may not overcome any problem described above.

SUMMARY OF THE INVENTION

In one aspect of the present invention, a process unit is provided which comprises: a photoconductor drum; a drum frame supporting the photoconductor drum; a development roller having a roller shaft, an outer peripheral surface of the development roller being disposed in contact with an outer peripheral surface of the photoconductor drum; and a development frame supporting the development roller at first and second end portions of the roller shaft. The development frame comprises a coupling joint provided at a first side of the development frame where the first end portion of the roller shaft is supported and a support portion provided at a second side of the development frame, opposite to the first side, where the second end portion of the roller shaft is supported. The coupling joint is disengageably engageable with an external driving force input element to transmit a rotatory force inputted therefrom to the development roller. The support portion is coaxial with the coupling joint, and the development frame is swingably supported at the coupling joint and the support portion by the drum frame. A center of rotation of the development roller is located in a position shifted from a line segment connecting a center of rotation of the coupling joint and a center of rotation of the photoconductor drum to an upstream side with respect to a direction of rotation of the coupling joint as viewed in an axial direction of the development roller, such that the development roller is pressed against the photoconductor drum by the action of the rotatory force received by the coupling joint.

With this configuration, a rotatory force transmitted to the coupling joint produces a rotation moment which tends to cause the development frame to rotate on the axis of rotation of the coupling joint, and this rotation moment may act as a pressing force causing the development roller to be pressed against the photoconductor drum.

According to the specific embodiments of the present invention as will be described below, even if the torque of the development roller becomes larger, the development roller is pressed against the photoconductor drum constantly in a stable manner, and thus an image of good quality can be formed. Moreover, since this torque is input through the coupling joint, such a force as would become a problem in the case where the torque is input through gears because the force acting on the gears tends to disengage the gears will not be produced; that is, no force other than a rotatory force about the axis of rotation of the coupling joint will be produced.

Furthermore, a rotatory force of the coupling joint rotating on the axis of rotation thereof is the only force that acts on the development frame at the axis of swinging motion thereof. To be more specific, since the axis of swinging motion of the development frame at which axis the development frame is supported by the drum frame is coaxial with the axis of rotation of the coupling joint, the rotatory force transmitted through the coupling joint would never cause the development frame to oscillate. Furthermore, since the development frame is swingable coaxially with the coupling joint, the rotation moment equally distributed over the length of the development roller causes the development roller to be pressed against the photoconductor drum. Consequently, the pressing force against the photoconductor drum as produced when the rotatory force is inputted through the coupling joint becomes stable.

BRIEF DESCRIPTION OF THE DRAWINGS

The above aspect and advantages, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

A detailed description will be given of exemplary embodiments of the present invention with reference to the drawings.

Laser Printer General Setup

Figure 1:
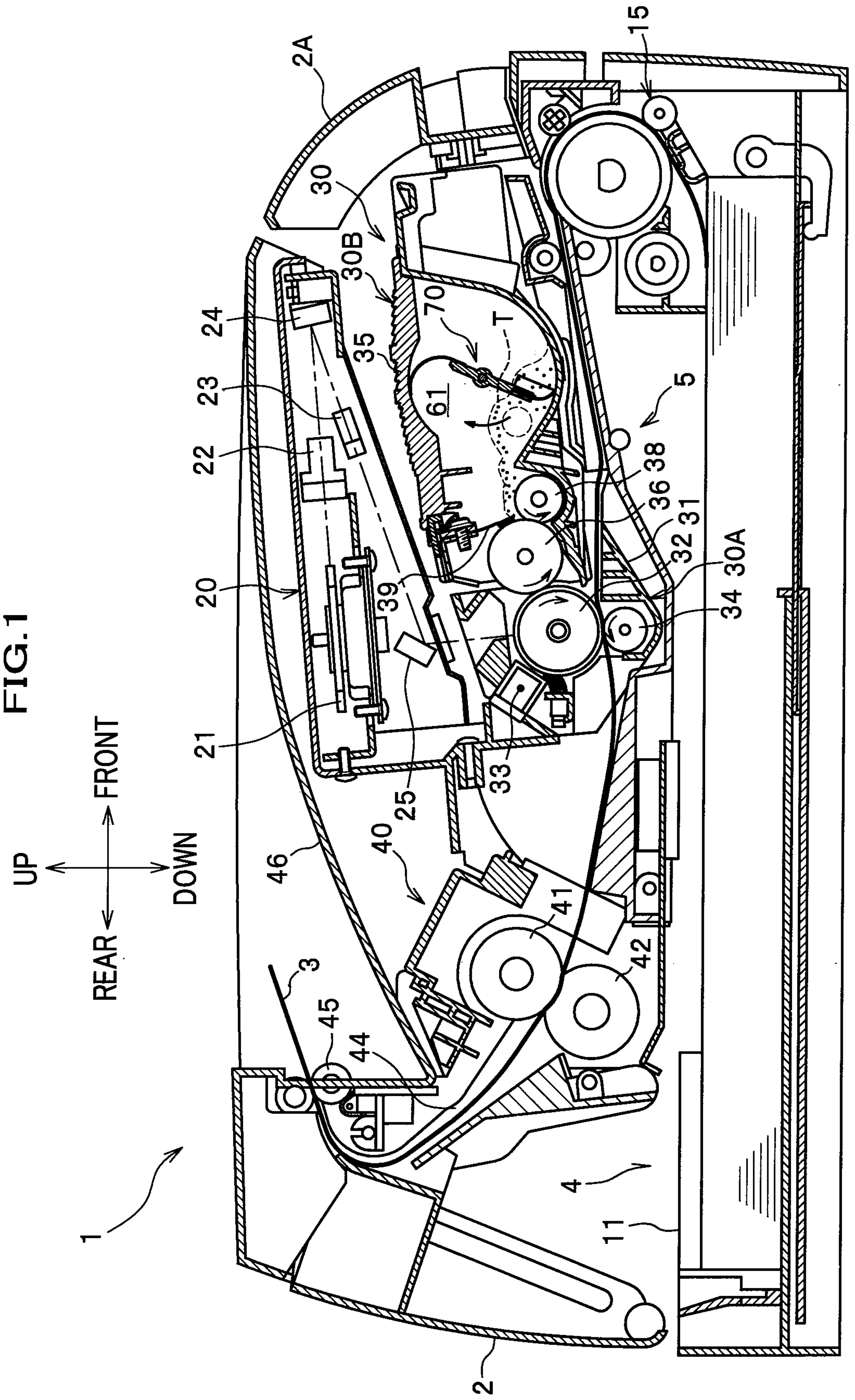
FIG. 1 is a sectional view of a principal portion of a laser printer according to an exemplary embodiment of the present invention.

Referring now to FIG. 1, a laser printer 1 comprises a body casing 2, a feeder unit 4 configured to feed a sheet 3 into the body casing 2, an image forming unit 5 configured to form an image on a sheet 3 fed by the feeder unit 4, and other components.

At a front side of the body casing 2 (in the following description, the right side of FIG. 1 will be referred to as "front", and the left side as "rear"), an openable front cover 2A is provided so that a process cartridge 30 that will be described later may be installed into or removed from the body casing 2 through an opening formed when the front cover 2A is opened.

Feeder Unit Setup

The feeder unit 4 comprises a sheet feed tray 11 removably installed in the body casing 2, a sheet feed mechanism 15 configured to convey a sheet 3 from the sheet feed tray 11 to the image forming unit 5. The sheet feed mechanism 15 comprises known components including a sheet feed roller, a separation roller, a separation pad and the like (of which reference numerals are not designated), and is configured to separate one sheet from the sheets 3 stacked in the sheet feed tray 11, to feed the sheets 3 one by one to the image forming unit 5 provided above the sheet feed mechanism 15.

Image Forming Unit Setup

The image forming unit 5 comprises a scanner unit 20, a process cartridge 30, a fixing unit 40 and other components.

Scanner Unit Setup

The scanner unit 20 is provided in an upper space within the body casing 2, and comprises a laser beam emitting device (not shown), a polygon mirror 21 configured to be driven to spin, lenses 22, 23, reflecting mirrors 24, 25 and other components. A laser beam formed and emitted by the laser beam emitting device in accordance with the image data travels paths indicated by alternate long and short dashed lines, so that an outer peripheral surface of a photoconductor drum 32 in the process cartridge 30 is irradiated and rapidly scanned with the laser beam.

Process Cartridge Setup

The process cartridge 30 is provided under the scanner unit 20, and configured to be attachable to and detachable from the body casing 2. The process cartridge 30 includes a photoconductor cartridge 30A which supports a photoconductor drum 32, and a developer cartridge 30B in which toner as developer is stored.

The photoconductor cartridge 30A principally includes a drum frame 31 which makes up an outer frame of the cartridge 30A, a photoconductor drum 32 provided in the drum frame 31, a scorotron charger 33, and a transfer roller 34.

The developer cartridge 30B includes a developer case 35 as one example of a development frame which defines a developer reservoir 61 for storing developer (toner T), and further includes, within the developer case 35, a development roller 36, a supply roller 38, a doctor blade 39 and an agitator 70. Among these components, the development roller 36, supply roller 38 and agitator 70 are rotatably supported by the developer case 35. Toner T in the developer case 35 is supplied to the development roller 36 as the supply roller 38 rotates in a direction indicated by an arrow (counterclockwise), and is then positively charged by friction between the supply roller 38 and the development roller 36. As the development roller 36 rotates in a direction indicated by an arrow (counterclockwise), the toner T supplied to the development roller 36 passes through a gap between the development roller 36 and the doctor blade 39 provided to restrict the layer thickness, and attains a predetermined thickness to form a thin layer of toner T which is carried on the development roller 36.

The photoconductor drum 32 is supported by the drum frame 31 which is combined with the developer cartridge 30B in such a manner that the photoconductor drum 32 is rotatable in a direction indicated by an arrow (clockwise) of FIG. 1. This photoconductor drum 32 comprises a grounded drum body and a positively chargeable photoconductive layer, wherein the drum body constitutes a core, and the photoconductive layer formed around the drum body provides an outer peripheral surface of the photoconductor drum 32.

The scorotron charger 33 is disposed oppositely above the photoconductor drum 32, and a predetermined clearance is left between the scorotron charger 33 and the photoconductor drum 32 so that the scorotron charger 33 is kept out of contact with the photoconductor drum 32. The scorotron charger 33 is a known positively electrically charging device of scorotron type which produces corona discharge from a charging wire made of tungsten or the like and designed to positively charge the surface of the photoconductor drum 32 uniformly.

The transfer roller 34 is disposed oppositely below the photoconductor drum 32 so that the transfer roller 34 is kept in contact with the photoconductor drum 32, and supported by the drum frame 31 in such a manner that the transfer roller 34 is rotatable in a direction indicated by an arrow (counterclockwise). This transfer roller 34 comprises a metal roller shaft and a conductive rubber material which is coated on the roller shaft. A transfer bias is applied to the transfer roller 34 by a constant current control during a transfer operation.

The surface of the photoconductor drum 32 which has been positively charged uniformly by the scorotron charger 33 is exposed to a rapidly scanning laser beam emitted from the scanner unit 20. In this way, a potential in the exposed area of the surface of the photoconductor drum 32 is lowered and an electrostatic latent image is formed in accordance with the image data. Hereupon, the “electrostatic latent image” is an invisible image pattern of exposed areas where a potential is lowered by exposure to the laser beam on the positively charged surface of the photoconductor drum 32. Next, as the development roller 36 rotates, toner T carried on the development roller 36 is brought into contact with the opposed photoconductor drum 32, and the toner T is supplied to the electrostatic latent image formed on the surface of the photoconductor drum 32. The toner T is selectively carried on the surface of the photoconductor drum 32 and thus visualizes the electrostatic latent image, to thereby form a toner image by a reversal process.

Thereafter, the photoconductor drum 32 and the transfer roller 34 are rotated and thus a sheet 3 is pinched therebetween and conveyed forward, so that the toner image carried on the surface of the photoconductor drum 32 is transferred onto the sheet 3.

Fixing Unit Setup

The fixing unit 40 is disposed downstream of the process cartridge 30, and comprises a heating roller 41, and a pressure roller 42 disposed opposite to the heating roller 41 so that a sheet 3 is pinched between the heating roller 41 and the pressure roller 42. The fixing unit 40 thus constructed is configured to thermally fuse and fix the toner T transferred onto the sheet 3 while the sheet 3 passes through a position between the heating roller 41 and the pressure roller 42, and then convey the sheet 3 to a sheet output path 44. The sheet 3 on the sheet output path 44 is ejected onto the sheet output tray 46 by the sheet output roller 45.

Process Cartridge Setup in Detail

Next, a detailed description will be given of the process cartridge 30 with reference to FIGS. 2-5.

Figure 2:
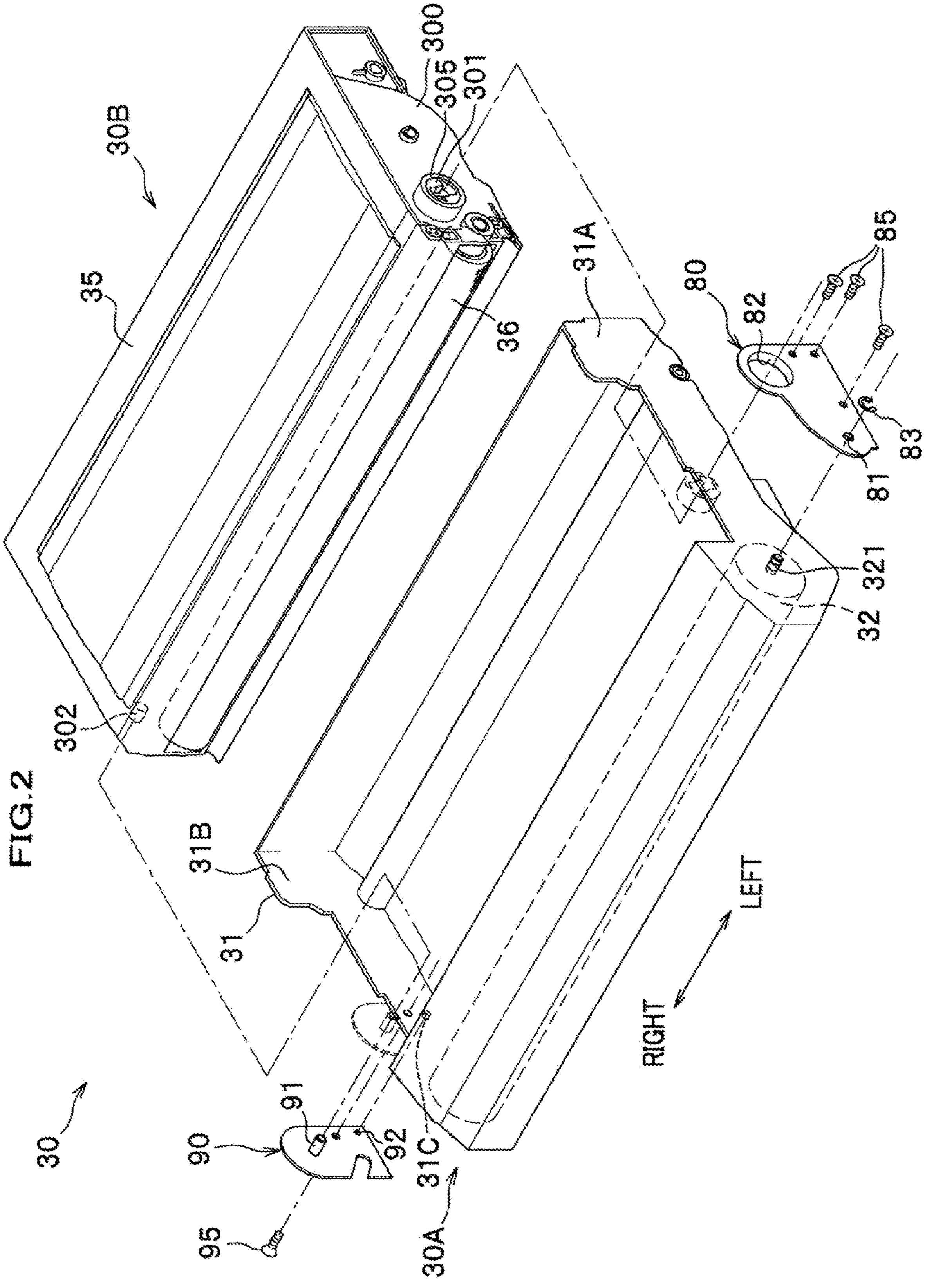
FIG. 2 is an exploded perspective view of a process cartridge.

As shown in FIG. 2, the process cartridge 30 comprises a photoconductor cartridge 30A configured to support the photoconductor drum 32 in such a manner that the photoconductor drum 32 is rotatable, a developer cartridge 30B configured to support the development roller 36 in such a manner that the development roller 36 is rotatable, a support plate 80 as one example of a support member which is mounted on a left side of the drum frame 31, and a support plate 90 which is mounted on a right side of the drum frame 31. In the present description, the right and left refer to the directions indicated in FIG. 2.

The support plate 80 is fixed on a left side plate 31A of the drum frame 31 by screws 85. The support frame 80 has a drum locating hole 81 through which a drum shaft 321 of the photoconductor drum 32 is inserted and held in place, and a joint locating hole 82 through which a coupling joint 301 for a developer cartridge 30B that will be described later is inserted and held in place, wherein a position of the coupling joint 301 held in place is a fixed distance away from a position of the drum shaft 321 of the photoconductor drum 32 held in place.

The drum locating hole 81 and the joint locating hole 82 are each formed by shaping the support plate 80 into a cylindrical shape.

The support plate 90 is fixed on a right side plate 31B of the drum frame 31 by a screw 95. The support plate 90 has a cylindrical projection 91 and a through hole 92 formed therein. The projection 91 projects laterally inwardly, and the through hole 92 is provided under the projection 91. The through hole 92 is a positioning hole configured to position the support frame 90 in place relative to the drum frame 31. The projection 91 is configured to be inserted in a support hole 302 of the developer case 35 which will be described later, so that the developer cartridge 30B is swingably supported by the drum frame 31. The support plates 80 and 90 are both fixed to the drum frame 31 in such a manner that the center of the joint locating hole 82 is aligned with the axis of the projection 91.

The through hole 92 is fitted on a projection 31C projecting laterally outwardly from the right side plate 31B of the drum frame 31 so that the support plate 90 is located in place relative to the drum frame 31.

In the developer cartridge 30B, the coupling joint 301 through which a rotatory force is inputted from an external driving force input element (not shown) to the development roller 36 is provided at a first side (left side) of the development case 35 where one of the end portions of the roller shaft 361 of the development roller 36 is supported and a support hole 302 as one example of a support portion which allows the projection 91 of the support plate 90 to be inserted therein is provided at a second side (right side) of the development case 35 where the other of the end portions of the roller shaft 361 is supported in a position coaxial with the coupling joint 301.

The developer cartridge 30B is supported at its support hole 302 in which the projection 91 of the support plate 90 fixed to the photoconductor cartridge 30A is inserted and at its coupling joint 301 inserted in the joint locating hole 82 of the support plate 80 fixed to the photoconductor cartridge 30A, in such a manner that the developer cartridge 30B is swingable on an axis coincident with the center of rotation of the coupling joint 301.

Figure 3:
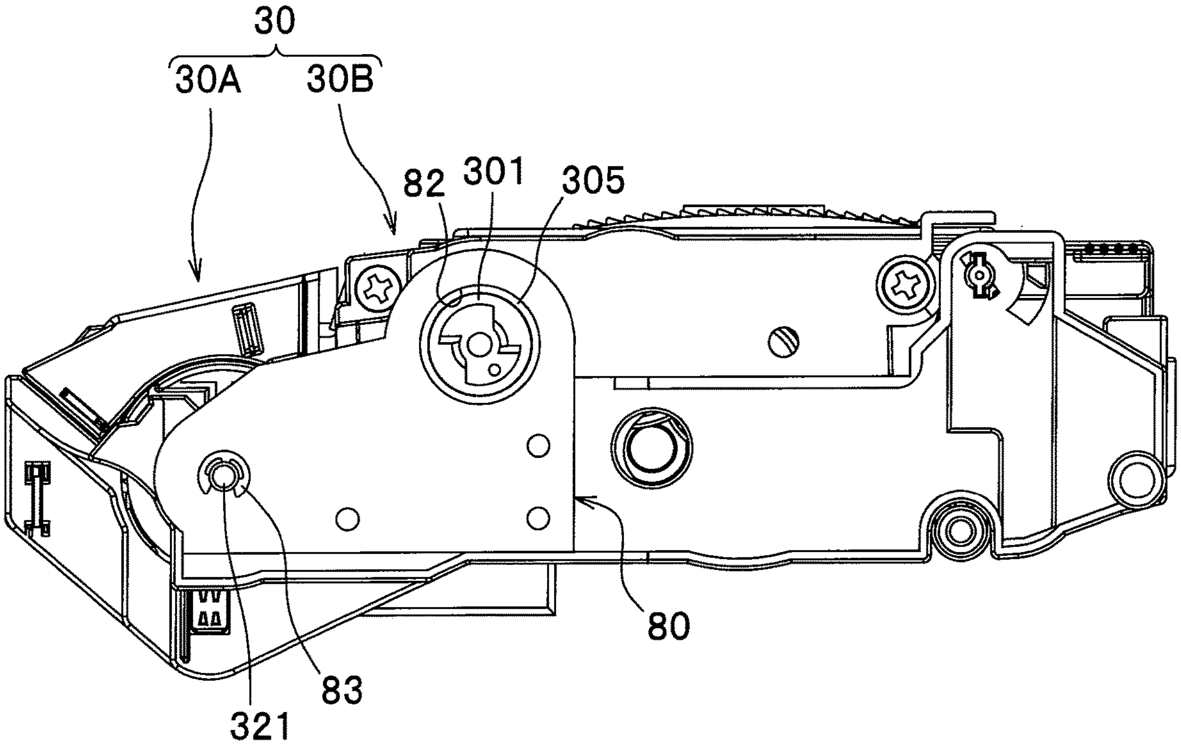
FIG. 3 is side view of the process cartridge.

As shown in FIG. 3, at the left side of the process cartridge 30, an end face of the coupling joint 301 is accessibly exposed within the joint locating hole 82, and thus disengageably engageable with the driving force input element (not shown) which is configured to be movable to and fro in a direction of the axis of rotation of the coupling joint 301 within the body casing 2.

A protective ring 305 formed in a part of a gear cover 300 is fitted on the coupling joint 301, so as to protect the sliding surface of the coupling joint 301.

A snap ring 83 is fitted on the drum shaft 321 of the photoconductor drum 32 protruding through the drum locating hole 81, so as to fix the position of the photoconductor drum 32 in its axial direction.

Figure 4:
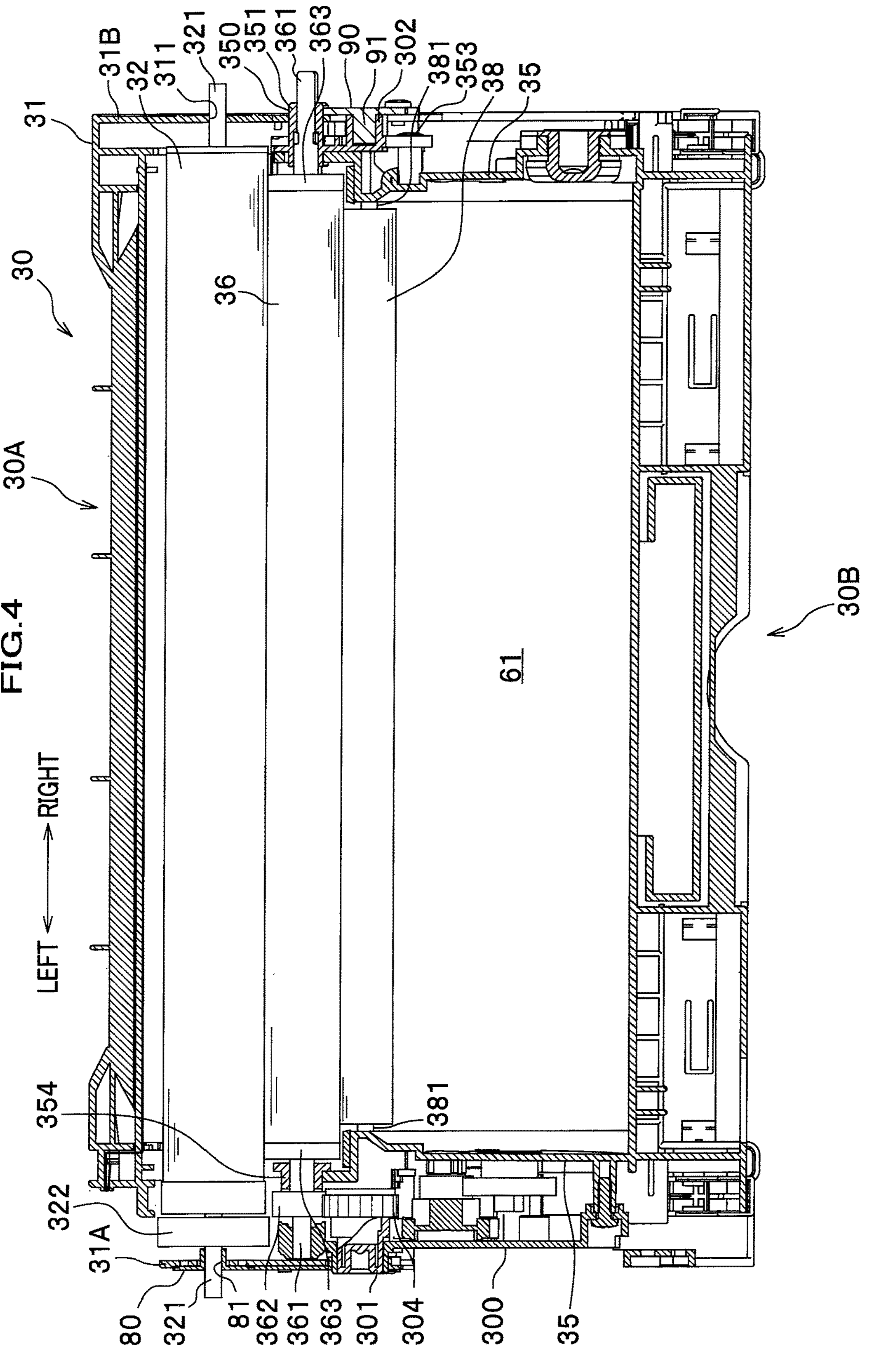
FIG. 4 is a sectional view of a developer cartridge as viewed from above.

As shown in FIG. 4, the coupling joint 301 is arranged through the gear cover 300 at the side of the developer case 35, with a transmission gear 304 provided at the laterally inward end portion of the coupling joint 301.

The transmission gear 304 meshes with a development roller gear 362 mounted on the roller shaft 361 of the development roller 36, so that a rotatory force inputted to the coupling joint 301 is transmitted through the transmission gear 304 and the development roller gear 362 to the development roller 36 to cause the development roller 36 to rotate.

Figure 5:
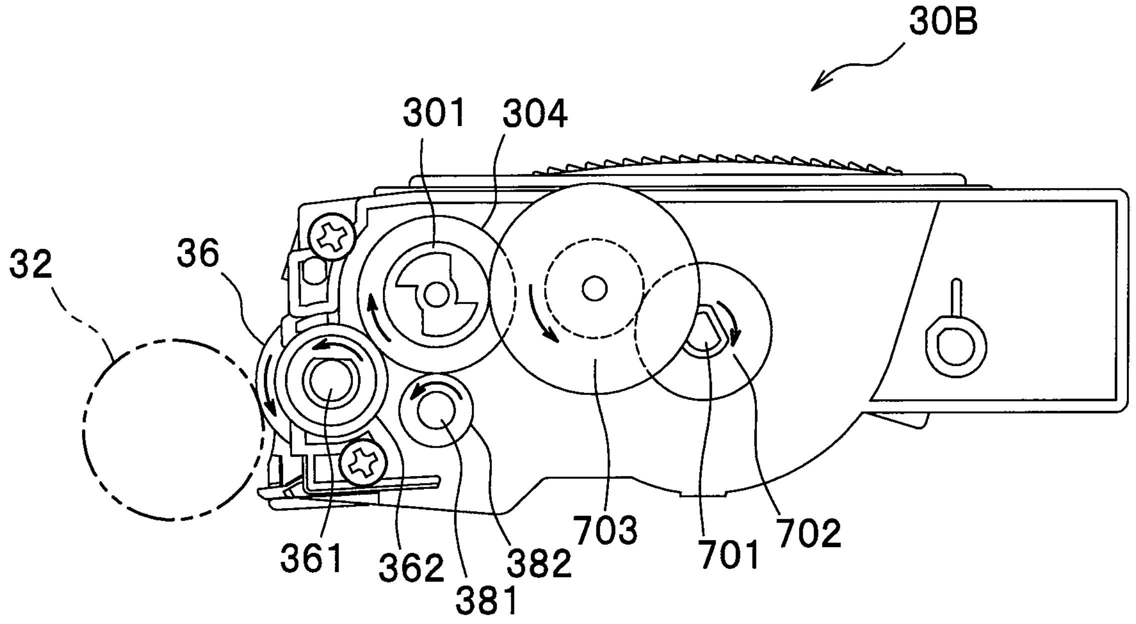
FIG. 5 is a side view of the developer cartridge, illustrating a state in which a gear cover provided at a side of the developer cartridge is removed.

Further, as shown in FIG. 5, the transmission gear 304 meshes with a supply roller gear 382 mounted on a roller shaft 381 of the supply roller 38, and with an idle gear 703 which in turn meshes with an agitator gear 702 mounted on a shaft 701 of the agitator 70, so that the rotatory force inputted to the coupling joint 301 is transmitted through the gears 382, 703, 702 to the supply roller 38 and the agitator 70 to cause the supply roller 38 and the agitator 70 to rotate.

On the other hand, the photoconductor drum 32 has a gear 322, as shown in FIG. 4, provided at a left end of the photoconductor drum 32 which gear 322 meshes with an external driving force input gear so that a rotatory force is received therethrough.

As shown in FIG. 4, the development roller 36 is supported by the developer case 35 with one end portion (at the left side) of the roller shaft 361 being inserted in a bearing part 354 provided in the developer case 35, and the other end portion (at the right side) of the roller shaft 361 being inserted in a cylindrical bearing part 351 provided in the developer case 35.

Here, the bearing part 351 at the right side is formed as a part of a bearing member 350. The bearing member 350 has a monolithic structure in which the bearing part 351 and a member defining the support hole 302 which admits the projection 91 of the support plate 90 are formed integrally. The bearing member 350 is fastened with a screw 353 and fixed securely to the developer case 35.

At each end, in the axial direction, of the development roller 36 (at each end portion of the roller shaft 361), an abutting rolling element 363 which is a cylindrical part made of plastic is provided coaxially with the development roller 36. Each abutting rolling element 363 is in contact with the outer peripheral surface of the photoconductor drum 32 and configured to restrict the distance between the outer peripheral surface of the photoconductor drum 32 and the roller shaft 361 (the center of rotation) of the development roller 36, so that the upper limit of the pressing force of the development roller 36 against the photoconductor drum 32 is restricted. The outside diameter of each abutting rolling element 363 is slightly smaller than the outside diameter of the development roller 36, and thus when the development roller 36 is pressed against the photoconductor drum 32 and deformed or collapsed to a predetermined extent, the abutting rolling elements 363 come in contact with the photoconductor drum 32 so that the development roller 36 will not be further deformed beyond the predetermined extent. This configuration is established in order to keep the distance between the roller shaft 361 of the development roller 36 and the outer peripheral surface of the photoconductor drum 32, and to keep the pressing force of the development roller 36 against the photoconductor drum 32 at a constant level.

The photoconductor drum 32 is supported by the drum frame 31 with one end portion (at the left side) of the drum shaft 321 being inserted in the drum locating hole 81 of the support plate 80 provided in the drum frame 31, and the other end portion (at the right side) of the drum shaft 321 being inserted in the support hole 311 provided in the right side plate 31B of the drum frame 31 itself.

The supply roller 38 which serves to supply toner T to the development roller 36 is supported by the developer case 35, at the both ends of the roller shaft 381 of the supply roller 38.

In the process cartridge 30 according to the present embodiment, the roller shaft 361 of the development roller 36, the drum shaft 321 of the photoconductor drum 32, and the roller shaft 381 of the supply roller 38 are disposed parallel to one another.

Figure 6:
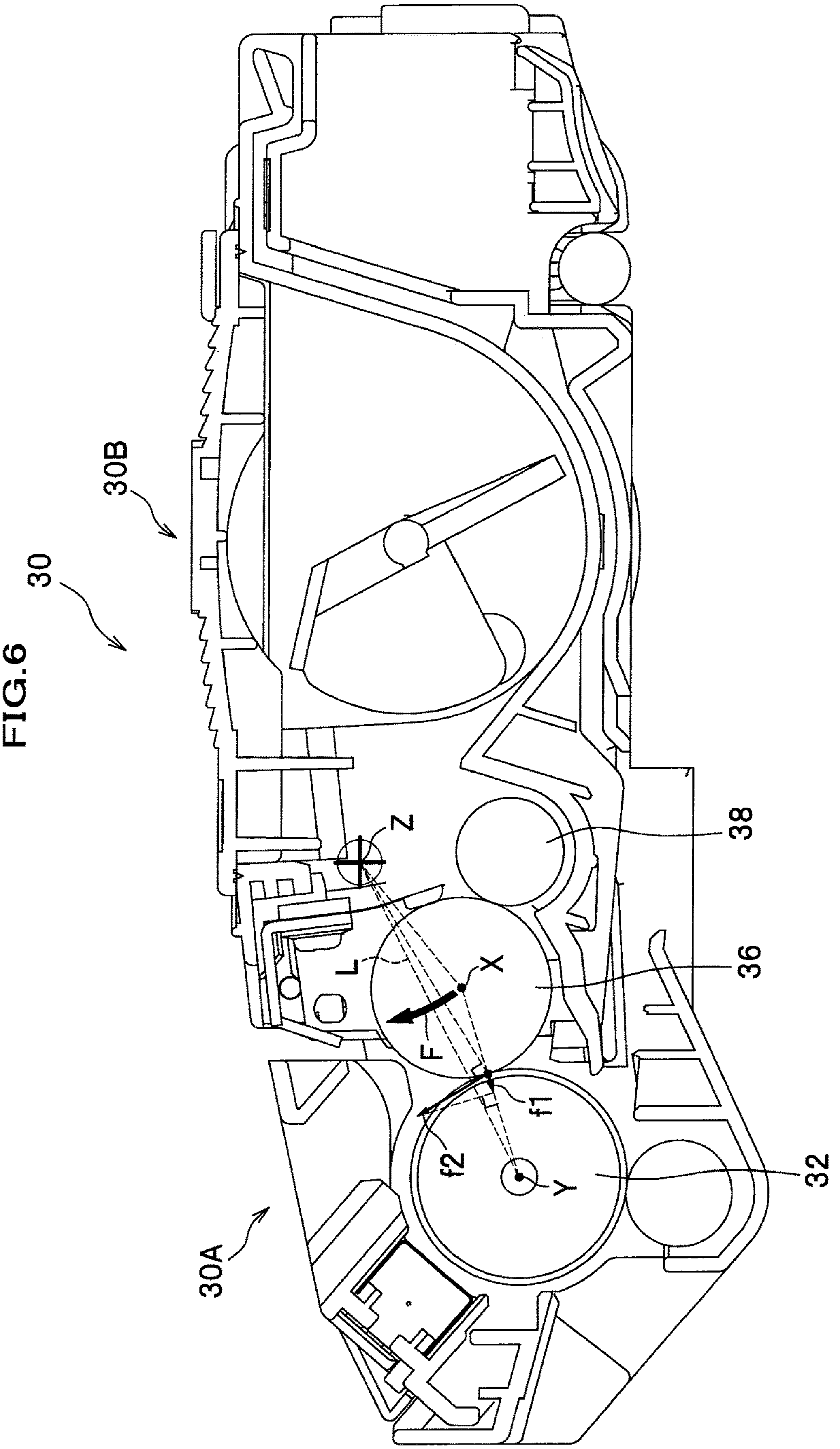
FIG. 6 is a schematic diagram for explaining an arrangement of a development roller.

As shown in FIG. 6, the photoconductor drum 32, the development roller 36 and the coupling joint 301 are placed accurately in relation to one another in such a manner that a center X of rotation of the development roller 36 when the developer cartridge 30B is viewed in the axial direction of the development roller 36 is located in a position shifted from a line segment L connecting a center Y of rotation of the photoconductor drum 32 and a center Z of rotation of the coupling joint 301 to an upstream side (lower side in FIG. 6) with respect to a direction of rotation of the coupling joint 301. Further, a center of rotation of the supply roller 38 is located in a position shifted from the line segment L connecting the center Z of rotation of the coupling joint 301 and the center Y of rotation of the photoconductor drum 32 to the upstream side with respect to the direction of rotation of the coupling joint 301 as viewed in the axial direction of the development roller 36. It is to be understood that the "upstream" side is one of the sides divided by the line segment L and is the side located upstream in the direction of rotation of the coupling joint 301 at a point where the gear teeth of the transmission gear 304 (see FIG. 5) passes across the line segment L (i.e., "upstream" when viewed from the photoconductor drum 32 to the coupling joint 301).

In the present embodiment, the relative positions of the center Y of rotation of the photoconductor drum 32 and the center Z of rotation of the coupling joint 301 are fixed by the support plates 80 and 90 provided in the photoconductor cartridge 30A, so that the photoconductor drum 32, development roller 36 and coupling joint 301 are placed satisfactorily in relation to one another in such a manner as described above.

The next discussion will focus on the operation and advantages of the process cartridge 30 configured as described above.

As shown in FIG. 5, when the coupling joint 301 is caused to rotate in a direction indicated by the arrow (clockwise), by a rotatory force inputted through the driving force input element, the development roller 36 is caused to rotate in a direction indicated by the arrow (counterclockwise) according as the coupling joint 301 rotates.

In this operation, according to the present embodiment, the developer used herein is a nonmagnetic monocomponent toner T which is charged by friction generated by the doctor blade 39 pressed against the development roller 36, and the friction thus generated between the development roller 36 and the doctor blade 39 gives a resistance to the rotation of the development roller 36 and to the rotation of the supply roller 38. Since this resistance tends to make the development roller 36 and the supply roller 38 integral, the rotatory force which causes the coupling joint 301 to rotate generates a rotatory force which causes the developer cartridge 30B in its entirety to rotate on the axis of rotation of the coupling joint 301, producing a rotation moment which causes the development roller 36 to turn around the axis (center Z) of rotation of the coupling joint 301.

The center X of rotation of the development roller 36 to which the rotation moment is applied tends to turn around the center Z of rotation of the coupling joint 301, and to move along a path indicated by a reference character F toward the line segment L which connects the center Y of rotation of the photoconductor drum 32 and the center Z of rotation of the coupling joint 301.

In this operation, the development roller 36 tends to turn around the center Z while pressing against the photoconductor drum 32 located at the downstream side with respect to the direction of the turning of the development roller 36, and produces a tangential force indicated by a reference character f2 and a pressing force indicated by a reference character f1 toward the center Y of rotation of the photoconductor drum 32 at a position in which the development roller 36 is in contact with the photoconductor drum 32.

Hereupon, since the abutting rolling elements 363 made of plastic are provided at the ends, in the axial direction, of the development roller 36 (at the end portions of the roller shaft 361), the abutting rolling elements 363 come in contact with the photoconductor drum 32 after the development roller 36 deforms (collapses) to a predetermined extent, so that the development roller 36 is prevented from further deforming. Therefore, the force pressing the photoconductor drum 32 against the development roller 36 is kept constant along the length in the axial direction.

Accordingly, a toner image can be formed in a uniform density along the entire length in the axial direction on the surface of the photoconductor drum 32, and thus fogging due to unevenness of the pressing force can be prevented from occurring, so that an image of good quality can be formed.

The following advantages can be achieved in the present embodiment described above.

The development roller 36 is located in such a position that the center X of rotation of the development roller 36 is located in a position shifted from the line segment L connecting the center Y of rotation of the photoconductor drum 32 and the center Z of rotation of the coupling joint 301 to the upstream side with respect to the direction of rotation of the coupling joint 301 when the development roller 36 is viewed in its axial direction (the direction of extension of the roller shaft 361). The rotatory force inputted to the coupling joint 301 causes the development roller 36 to turn around the center Z of rotation of the coupling joint 301 so that the development roller 32 is pressed against the photoconductor drum 32. Thus, the rotatory force inputted to the coupling joint 301 can serve to bring the development roller 36 into contact with the photoconductor drum 32 uniformly along the length in the axial direction. In the present embodiment where the rotation of the development roller 36 undergoes the resistance derived from the doctor blade 39, the advantages described above may become particularly conspicuous when the rotation speed of the development roller 36 is increased. That is, the present invention is effective particularly when a nonmagnetic monocomponent toner T is used.

Consequently, fogging due to unevenness of the pressing force, and unevenness of density which would otherwise appear like corrugated patterns in proximity to a side edge of a sheet 3 on which an image is formed, can be prevented from occurring, and thus an image of good quality can be formed. Furthermore, the image formation can be performed while positively utilizing the moment of rotation around the center Z of rotation of the coupling joint 301 generated due to the rotatory force inputted to the coupling joint 301.

Since the driving force inputted to cause the development roller 36 to be pressed against the photoconductor drum 32 is inputted through the coupling joint 301, the moment of rotation around the center of rotation of the coupling joint 301 only is given to the developer case 35. To be more specific, if the driving force were input to a gear instead of the coupling joint 301, the gear would be given a force thrusting the gear away from another gear from which the driving force is transmitted, and the rotation moment of the developer case 35 would become unstable due to this thrusting force. However, in the present embodiment, the coupling joint 301 which is disengageably engageable with an external driving force input element in the direction of the center of rotation of the coupling joint 301 to transmit a rotatory force inputted therefrom to the development roller is adopted, and thus no superfluous force other than the moment of rotation around the coupling joint 301 is given to the developer case 35.

Moreover, since the developer case 35 is swingably supported by the drum frame 31 at the coupling joint 301 and the support hole 302 which are coaxially provided in the developer case 35, the rotatory driving force inputted through the coupling joint 301 will never cause the developer case 35 to oscillate. Furthermore, since the developer case 35 is swingable coaxially with the coupling joint 301, the rotation moment which presses the development roller 36 against the photoconductor drum 32 is distributed over the length of the development roller 36. As a result, the pressing force against the photoconductor drum 32 when the driving force is inputted becomes stable. Furthermore, since the axis of rotation of the coupling joint 301 coincides with the axis of swinging motion of the developer case 35, no force which would tend to bend the developer frame 35 is produced by the driving force inputted through the coupling joint 301.

Moreover, the coupling joint 301 is supported through the support frame 80 comprising: the drum locating hole 81 which holds the drum shaft 321 of the photoconductor drum 32 in a first position; and the joint locating hole 82 in which the coupling joint 301 is inserted and which holds the coupling joint 301 in a second position that is a fixed distance away from the first position (in which the drum shaft 321 of the photoconductor drum 32 is located).

With this configuration, the center Y of rotation of the photoconductor drum 32 and the center Z of rotation of the coupling joint 301 are placed accurately in relation to each other, and the roller shaft 361 of the development roller 36 to which the rotatory force is transmitted from the coupling joint 301 and the drum shaft 321 of the photoconductor drum 32 are placed accurately in relation to each other; thus, the development roller 36 can be placed in a position in which the development roller 36 is in contact with the photoconductor drum 32 without fail.

Furthermore, the coupling joint 301 is supported through the protective ring 305 within the joint locating hole 82.

With this configuration, the wearing out of the surface of the coupling joint 301 sliding within the joint locating hole 82 can be prevented.

Furthermore, on each of the end portions of the roller shaft 361 of the development roller 36, the abutting rolling element 363 is provided which is configured to regulate the pressing force of the development roller 36 against the photoconductor drum 32.

With this configuration, the distance between the axes of the development roller 36 and the photoconductor drum 32 are rendered invariable so that the pressing force of the development roller 36 against the photoconductor drum 32 can be rendered constant.

The present invention is not limited to the above-described embodiment, but may be utilized in a variety of forms as exemplified below.

In the above-described embodiment, the support plates 80 and 90 are provided at the left and right sides of the drum frame 31, respectively, so that the developer case 35 is supported by the support plates 80 and 90. However, the developer case 35 may be supported directly by the left and/or right side plates 31A, 31B of the drum frame 31 at one or both of the left and right sides of the drum frame 31.

In the above-described embodiment, the projection 91 of the support plate 90 fixed to the photoconductor cartridge 30A is inserted in the support hole 302 provided at the second side of the developer cartridge 30B where the second end portion of the roller shaft 361 of the development roller 36 is supported, to thereby support the developer cartridge 30B. However, a projection provided instead of the support hole 302 may be inserted in a support hole provided in the photoconductor cartridge 30A so as to support the developer cartridge 30B.

Figure 7:
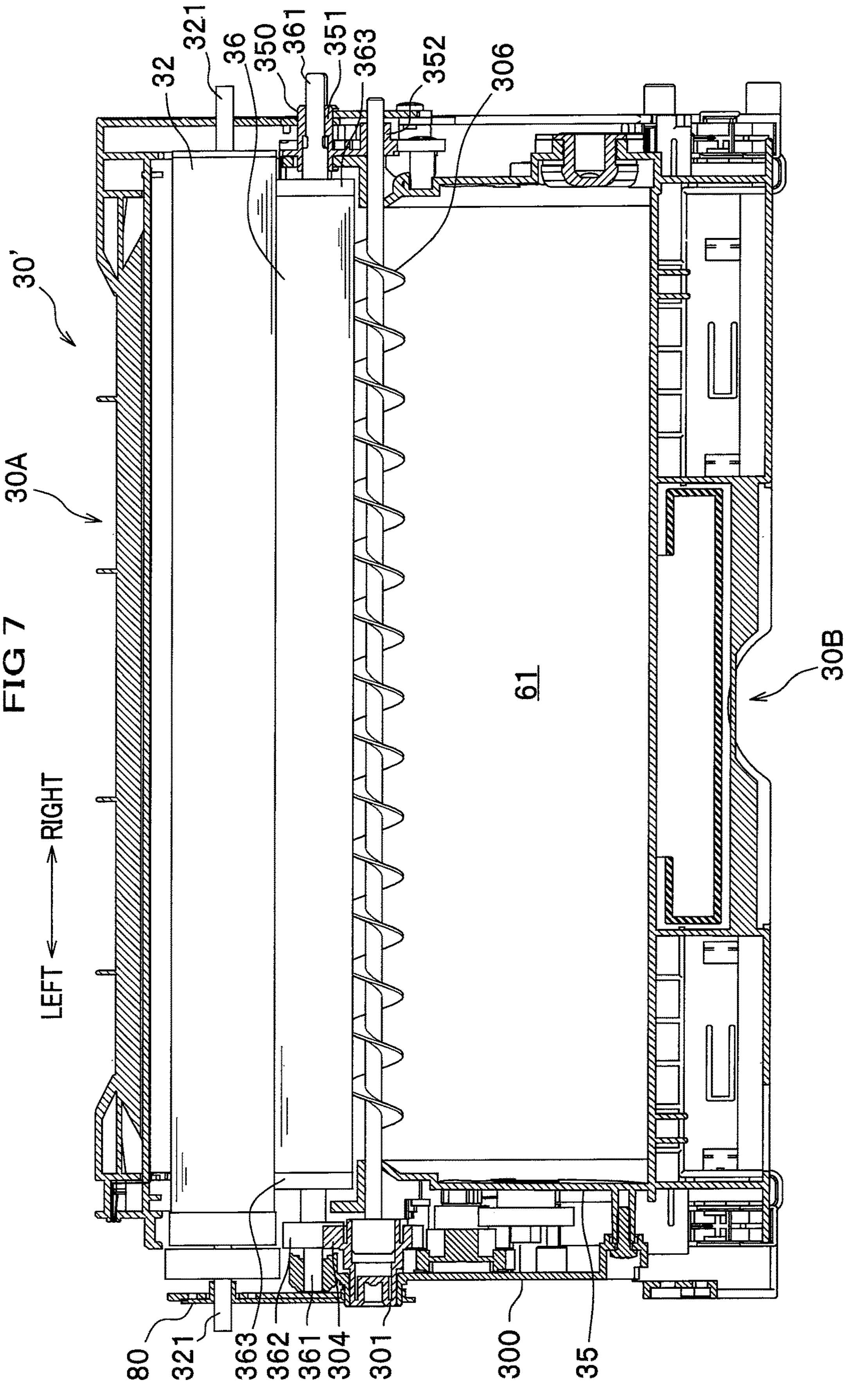
FIG. 7 is a sectional view of a process cartridge as viewed from above according to a modified embodiment of the present invention.

In the above-described embodiment, the developer cartridge 30B is swingably supported by the coupling joint 301 provided at the first side of the photoconductor cartridge 30A and the support hole 302 provided coaxially with, but separately from, the coupling joint 301 at the second side of the photoconductor cartridge 30A. However, the coupling joint 301 and the support hole 302 may be connected by a connecting member as shown in FIG. 7. In the process cartridge 30' illustrated in FIG. 7, an auger 306 as one example of the connecting member is disposed inside the developer cartridge 30B (in the developer reservoir 61), wherein the left end of the auger 306 engages with an inner end of the coupling joint 301, while the right end of the auger 306 protrudes through the right side wall of the developer cartridge 30B. In the embodiment shown in FIG. 7, the bearing member 350 comprises not only the bearing part 351 for the development roller 36 but also a bearing part 352 for the auger 306, and these bearing parts 351, 352 are formed integrally in the bearing member 350 which is fixed to the developer case 35.

Without the connecting member as in the above-described embodiment, the rotatory force inputted from the coupling joint 301 acts on the developer case 35 in such a way that the rotatory force causes developer case 35 to be twisted. In contrast, with the connecting member provided as in the modified embodiment of FIG. 7, the rotatory force is transmitted through the connecting member from the left side to the right side of the developer case 35, and the twisting of the developer case 35 is suppressed. Moreover, since the connecting member is the auger 306 disposed in the developer reservoir 61 in the modified embodiment of FIG. 7, the rotation of the coupling joint 301 can serve to agitate the toner T in the developer reservoir 61. It is to be understood that, in this modified embodiment, the connecting member may not necessarily be disposed inside the developer case 35, but may be disposed outside the developer case 35.

In the above-described embodiment, the coupling joint 301 is supported by the support plate 80 through the protective ring 305, but it is to be understood that the protective ring 305 is not indispensable. The coupling joint 301 may be supported directly in the drum locating hole 81 of the support plate 80, instead.

Figure 8A:
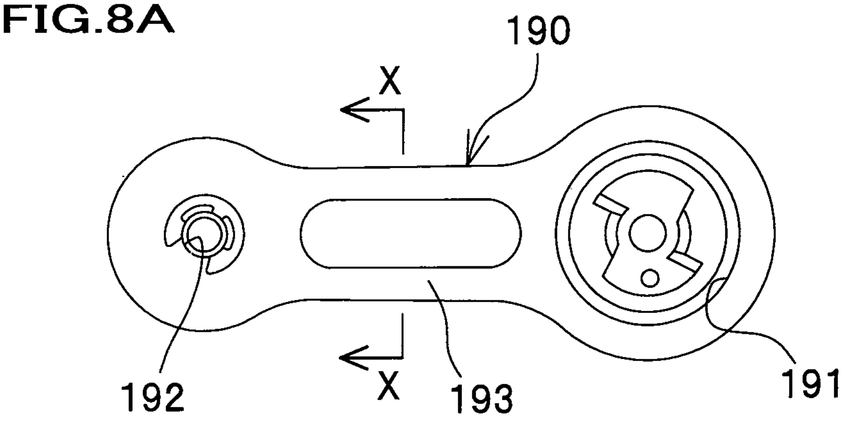
FIG. 8A is a front elevation illustrating another example of a support member.
Figure 8B:
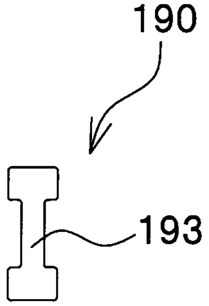
FIG. 8B is a sectional view of the support member taken along line X-X of FIG. 8A.

In the above-described embodiment, the support plate 90 illustrated as a sheet-like member is taken as an example of the support member, but the support member may be configured in various other forms as long as the support member is a member which is fixed to the drum frame 31, or part of the drum frame 31 disposed, at the first side of the developer case 35 where the first end portion of the drum shaft 321 of the photoconductor drum 32 is disposed and the coupling joint 301 is disposed, and which can support the coupling joint 301 and the photoconductor drum 32 with a sufficient rigidity, and which holds the photoconductor drum 32 and the coupling joint 301 in place so that the distance between the axes of rotation of the photoconductor drum 32 and the coupling joint 301 are rendered invariable. For example, the support member consistent with the present invention is not limited to the sheet-like member, but a rod-like member such as a support rod 190 as illustrated in FIGS. 8A and 8B may be applicable which comprises a first portion defining a support hole 191 for supporting the coupling joint 301, a second portion defining a support hole 192 for supporting the photoconductor drum 32, and rod-like connecting portions 193 for connecting the first and second portions.

What is claimed is:

1. A cartridge comprising:

a drum frame extending in a first direction, the drum frame including a first side and a second side spaced away from the first side in the first direction, the drum frame including a photoconductor drum, the photoconductor drum being rotatable about a first axis extending in the first direction;

a development frame including a third side and a fourth side spaced away from the third side in the first direction, the development frame including a development roller, the development roller being rotatable about a second axis extending in the first direction, the development roller including a roller shaft extending in the first direction;

a coupling joint disposed at the third side of the development frame, the coupling joint being rotatable about a third axis extending in the first direction;

a first support plate disposed at the first side of the drum frame and the third side of the development frame, the first support plate having a first hole;

a second support plate disposed at the second side of the drum frame and the fourth side of the development frame, the second support plate including a first engagement portion;

a first screw;

a second screw; and a bearing disposed at the fourth side of the development frame, one end of the roller shaft being inserted in the bearing, the bearing including a second engagement portion, wherein the development frame is swingable relative to the drum frame about the coupling joint in a state where the coupling joint is inserted in the first hole, wherein the first support plate is fixed to the first side of the drum frame by the first screw, and not fixed to the third side of the development frame by the first screw, wherein the second support plate is fixed to the second side of the drum frame by the second screw, and not fixed to the fourth side of the development frame by the second screw, and wherein the development frame is swingable relative to the drum frame about the coupling joint in a state where the first engagement portion is engaged with the second engagement portion.

2. The cartridge according to claim 1, wherein the first support plate has a second hole, and wherein the photoconductor drum includes a drum shaft extending in the first direction, the drum shaft being inserted in the second hole.

3. The cartridge according to claim 1, wherein the development frame is swingable relative to the photoconductor drum about the third axis.

4. The cartridge according to claim 1, further comprising a transmission gear disposed at the third side of the development frame, the transmission gear being configured to rotate about the third axis together with the coupling joint.

5. The cartridge according to claim 4, wherein the development roller includes a development roller gear disposed at the third side of the development frame, the development roller gear being configured to rotate about the second axis together with the development roller, the development roller gear being disposed closer to the first support plate than to the second support plate in the first direction, and wherein the transmission gear is disposed closer to the first support plate than to the second support plate in the first direction, and the development roller gear directly meshes with the transmission gear.

6. The cartridge according to claim 5, wherein the development frame is swingable relative to the drum frame about the coupling joint in a state where the first support plate is fixed to the first side of the drum frame by the first screw, and the development roller gear directly meshes with the transmission gear.

7. The cartridge according to claim 6, further comprising a third screw, wherein the first support plate is fixed to the first side of the drum frame by the third screw.

8. The cartridge according to claim 1, wherein the roller shaft is configured to rotate about the second axis together with the development roller.

9. The cartridge according to claim 1, wherein the first engagement portion of the second support plate is a protrusion, and wherein the second engagement portion of the bearing is a hole.

* * * * *